(12) United States Patent
Ikedo

(10) Patent No.: US 7,721,083 B2
(45) Date of Patent: May 18, 2010

(54) CPU RUNAWAY DETERMINATION CIRCUIT AND CPU RUNAWAY DETERMINATION METHOD

(75) Inventor: Kenji Ikedo, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 584 days.

(21) Appl. No.: 11/790,836

(22) Filed: Apr. 27, 2007

(65) Prior Publication Data

US 2007/0288741 A1 Dec. 13, 2007

(30) Foreign Application Priority Data

May 1, 2006 (JP) ............................. 2006-127394
Feb. 26, 2007 (JP) ............................. 2007-044919

(51) Int. Cl.
*G06F 15/177* (2006.01)
(52) U.S. Cl. ............................. 713/2; 713/1; 713/100; 714/51; 714/55

(58) Field of Classification Search ..................... 713/1, 713/2, 100
See application file for complete search history.

(56) References Cited

U.S. PATENT DOCUMENTS

| | | | | |
|---|---|---|---|---|
| 5,594,865 A | * | 1/1997 | Saitoh | ........................... 714/55 |
| 5,737,212 A | * | 4/1998 | Fang et al. | ...................... 700/1 |
| 5,809,229 A | * | 9/1998 | Mori | ............................ 714/55 |
| 7,343,476 B2 | * | 3/2008 | Floyd et al. | .................. 712/216 |

FOREIGN PATENT DOCUMENTS

| | | |
|---|---|---|
| JP | 5-87644 | 11/1993 |
| JP | 2005-92430 | 4/2005 |

* cited by examiner

*Primary Examiner*—Nitin C Patel
(74) *Attorney, Agent, or Firm*—Drinker Biddle & Reath LLP

(57) ABSTRACT

A CPU reads a clear pattern held in a register in a watchdog timer when a system is booted up or reset, thereby determining whether or not the boot-up or the reset is a reset performed by the system or a reset due to runaway of a program to be executed and performing a process for booting up the system so as not to restart the task in which the runaway has occurred.

12 Claims, 2 Drawing Sheets

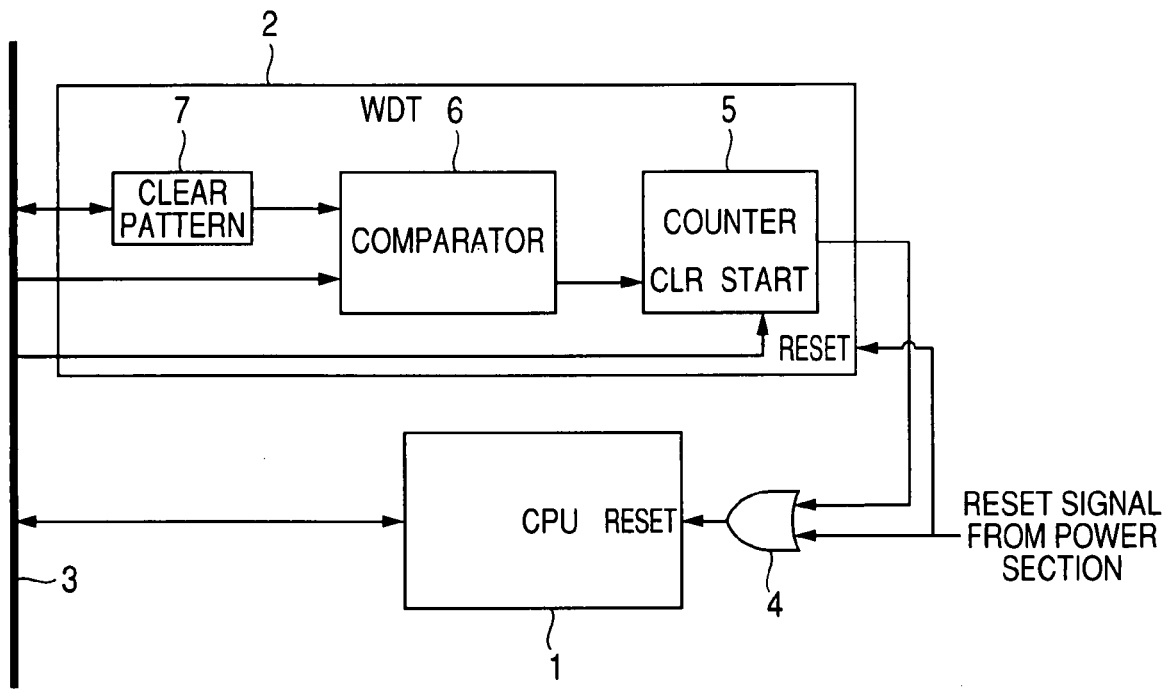

CPU RUNAWAY DETERMINATION CIRCUIT AND CPU RUNAWAY DETERMINATION METHOD

This application claims foreign priorities based on Japanese Patent application No. 2006-127394, filed May 1, 2006, and Japanese Patent application No. 2007-044919, filed Feb. 26, 2007, the contents of which are incorporated herein by reference in their entireties.

BACKGROUND OF THE INVENTION

1. Field of the Invention

The present invention relates to a CPU (Central Processing Unit) runaway determination circuit and a CPU runaway determination method, provided in a computer-embedded device such as a microcomputer board incorporated in a home-use appliance.

2. Description of the Related Art

A control circuit of the computer-embedded device is provided with a watchdog timer. The watchdog timer is arranged to generate a reset signal when the CPU has entered a runaway state in a logic circuit including the CPU, and to reboot the CPU thereby preventing runaway of the CPU. Specifically, when a clear signal is input from the CPU to the watchdog timer, the watchdog timer resets a counter. When the clear signal from the CPU is stopped and a count value reaches a predetermined value, the CPU is determined to have entered the runaway state. Then, the watchdog timer outputs a reset signal to the CPU.

As a specific example of the watchdog timer, there has been proposed a CPU runaway determination circuit in which a delay circuit which operates at a rising edge of a power VC is provided at an input port of a CPU. From a logic value of the state of the input port immediately after the CPU is reset, a determination is made as to whether a start is an initial start by activation of power or a restart due to the runaway (JP-U-5-87644).

Further, in connection with an information processor in which a CPU reads a program stored in ROM (Read-Only Memory) or RAM (Random Access Memory) and a plurality of program-processing sections run the program, there has been proposed a watchdog timer for specifying in which of the program-processing sections a runaway has occurred. Specifically, the watchdog timer is provided with a status register having storage areas assigned to first and second program-processing sections which are subjected to monitoring. Upon detection of any of the program-processing sections in which the runaway has occurred, the watchdog timer writes a result of detection into a corresponding storage area within the status register. Upon receipt of a notice of detection of a runaway from the watchdog timer, the control section makes a reference to the storage areas of the status register, thereby specifying the program-processing section in which the runaway has occurred (JP-A-2005-92430).

However, when the delay circuit is provided at the input port of the watchdog timer in JP-U-5-87644, the CPU determines that the start is a restart due to the runaway. In a case where a problem still exists in a program or hardware even when the CPU is initialized by the reset signal from the watchdog timer, there is a risk that the runaway occurs repeatedly. Moreover, when an element such as memory is broken, the runaway immediately occurs even when the CPU is rebooted.

Moreover, JP-A-2005-92430, when the watchdog timer has detected the runaway of the program-processing section, the control section can make a reference to the storage areas of the status register, to thus specify the program-processing section in which the runaway has occurred and be able to appropriately handle the program-processing section. However, latch circuits must be provided as many as the program-processing sections executed by the control section. Therefore, when the number of programs to be executed by the control section increases, the circuit configuration becomes more complicated and intricate, thereby increasing the number of components and eventually increasing a manufacturing cost.

There are many cases where even in a control circuit of a computer-embedded device, a plurality of tasks is executed as a result of a logic circuit including a CPU having recently become of higher performance and of higher functionality. In this case, it is required to specify in which task (process or thread) a runaway has occurred, and reset the system while avoiding the task in which the runaway has occurred.

SUMMARY OF THE INVENTION

The present invention has been made in view of the above circumstances, and provides a CPU runaway determination circuit and a CPU runaway determination method, for specifying in which task the runaway has occurred and capable of resetting a system by avoiding restart of the task in which the runaway has occurred, by a simple circuit configuration.

In some implementations, a CPU runaway determination circuit of the invention in a system, comprising:

a CPU for executing a task; and a watchdog timer which has a counter that starts counting upon reception of a start signal from the CPU, and outputs a reset signal when the counter reaches a preset count value, wherein the watchdog timer has a register in which a clear pattern corresponding to the task is set by the CPU, the clear pattern in the register is rewritten into an initial value by a reset signal from a power section, the CPU reads the clear pattern held in the register when the system is booted up so as to determine whether the boot-up is caused by a reset by the reset signal from the power section or a reset by the reset signal from the watchdog timer, and when it is determined that the boot-up is caused by the reset by the reset signal from the watchdog timer, the CPU boots up the system so as not to restart the task corresponding to the clear pattern held in the register.

In the CPU runaway determination circuit, when the read clear pattern is the initial value, the CPU determines that the boot-up is caused by the reset by the reset signal from the power section, and when the read clear pattern corresponds to the task, the CPU determines that the boot-up is caused by the reset by the reset signal from the watchdog timer.

The CPU runaway determination circuit, further comprising:

an OR circuit of which output terminal is connected to a reset terminal of the CPU, and of which one of input terminals is connected to an output terminal of the watchdog timer, wherein the OR circuit outputs a reset signal to the CPU by implementing a logical OR operation of the reset signal from the watchdog timer and the reset signal from the power section.

In the CPU runaway determination circuit, the watchdog timer has a comparator which compares a clear pattern of a clear signal output from the CPU with the clear pattern held in the register in the watchdog timer, and the watchdog timer clears a count value of the counter when there is a match between the clear pattern of the clear signal and the clear pattern held in the register.

In the CPU runaway determination circuit, the CPU outputs the clear signal to the watchdog timer at a predetermined timing while a runaway does not occur in the task being executed by the CPU.

In the CPU runaway determination circuit, when the CPU executes another task, the CPU rewrites the clear pattern held in the register into a predetermined clear pattern corresponding to the another task.

In some implementations, a CPU runaway determination method of the invention for a system, comprising:

setting a clear pattern corresponding to a task, in a register in a watchdog timer by a CPU that executes the task;

starting counting of a counter in the watchdog timer upon reception of a start signal from the CPU;

outputting a reset signal from the watchdog timer when the counter reaches a preset count value;

rewriting the clear pattern in the register into an initial value by a reset signal from a power section;

reading the clear pattern held in the register by the CPU when the system is booted up, so as to determine whether the boot-up is caused by a reset by the reset signal from the power section or a reset by the reset signal from the watchdog timer; and booting up the system by the CPU so as not to restart the task corresponding to the clear pattern held in the register when it is, determined that the boot-up is caused by the reset by the reset signal from the watchdog timer.

BRIEF DESCRIPTION OF THE DRAWINGS

FIG. 1 is a block diagram of a CPU runaway determination circuit according to an embodiment of the invention.

FIG. 2 is a descriptive view showing an example of a clear pattern.

DESCRIPTION OF THE PREFERRED EMBODIMENTS

Figure 3:
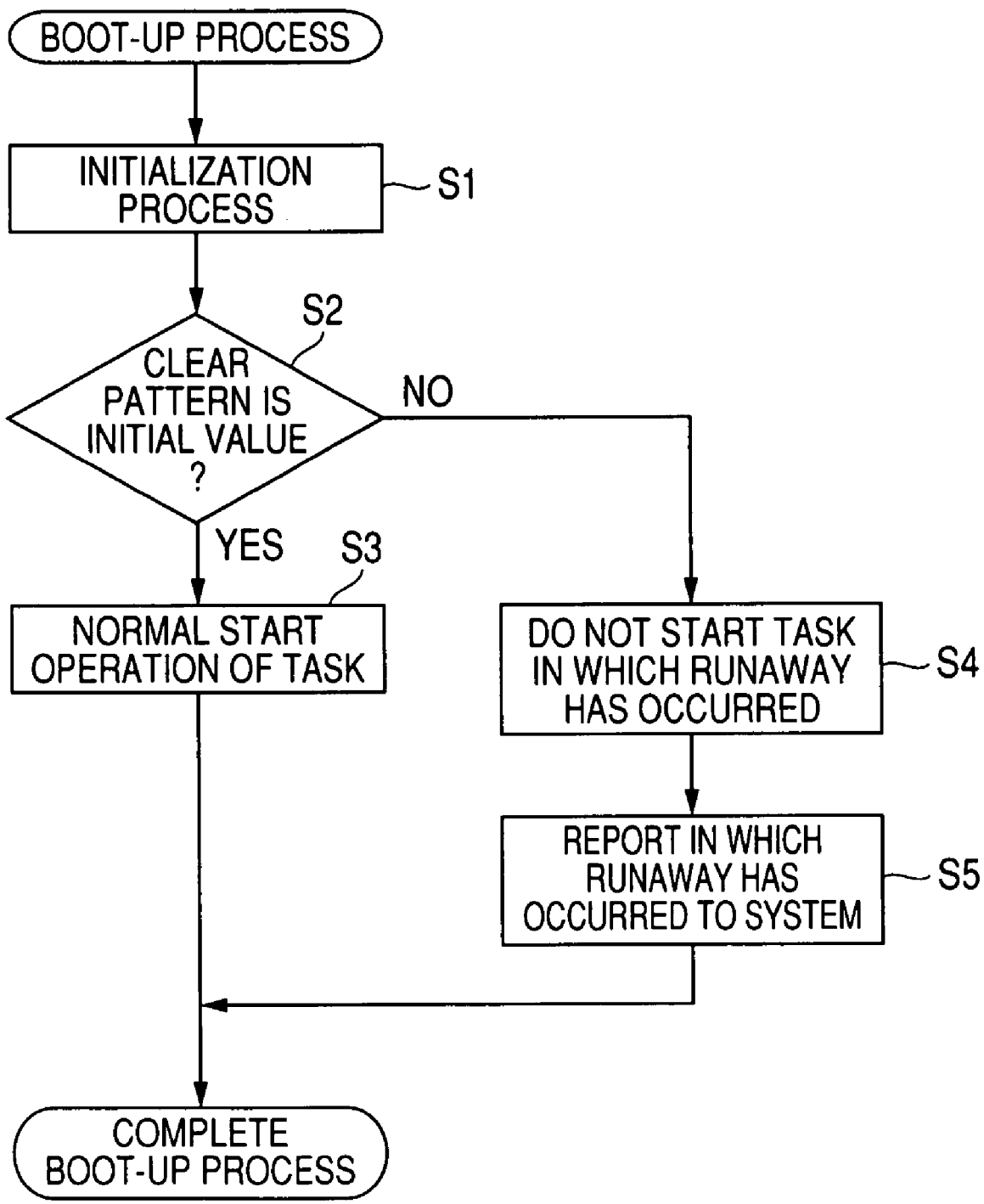
FIG. 3 is a flowchart of a boot-up process operation of the CPU runaway determination circuit.

An embodiment of a CPU runaway determination circuit of the present invention will be described in detail hereunder by reference to the accompanying drawings. In the present embodiment, a CPU runaway determination circuit provided in a control circuit of a computer-embedded device will be described. It is assumed that there is multitask process or multithread process in which a control section such as CPU executes a plurality of programs, as a function of the control circuit.

First, a circuit configuration of the CPU runaway determination circuit will be described by reference to FIG. 1.

A CPU 1 and a watchdog timer 2 are electrically connected via a bus line 3. The CPU 1 reads into RAM a plurality of programs stored in unillustrated ROM and executes the programs, to thus control operations of individual sections in the system.

An output terminal of an OR circuit 4 is connected to a reset terminal of the CPU 1, and one of input terminals of the OR circuit 4 is connected to an output terminal of the watchdog timer 2. A reset signal to the CPU 1 is output by implementing a logical OR operation of a reset signal output from the watchdog timer 2 and a reset signal output from a power section.

The watchdog timer 2 has a counter 5 which starts counting upon receipt of a start signal from the CPU 1. When the counter 5 reaches a preset count value, the reset signal is output to the input terminal of the OR circuit 4.

The watchdog timer 2 holds a clear pattern corresponding to the reset signal from the power section and a task accepted by the CPU, in a register 7. The clear pattern is a pattern used to clear the counter. When the system is booted up or reset, the CPU 1 reads the clear pattern held in the register 7 in the watchdog timer 2, thereby determining whether or not the boot-up operation (including the reset) corresponds to a reset performed by the system or a reset due to a runaway of a program being executed. Then, the CPU 1 performs a process for booting up the system so as not to restart the task in which the runaway has occurred.

The watchdog timer 2 compares a clear pattern of a clear signal output from the CPU 1 with the clear pattern held in the register 7 in the watchdog timer 2, by a comparator 6. When there is a match between the clear pattern of the clear signal and the clear patter held in the register 7, a clear signal is output to a clear terminal of the counter 5, thereby clearing the count value.

The watchdog timer 2 holds the clear pattern written by the CPU 1 into the register 7. When the reset signal is input from the power section to the reset terminal, the watchdog timer 2 updates the clear pattern of the register 7 and rewrites the pattern to an initial value. When the task being executed is switched, the CPU 1 writes into the register 7 the clear pattern corresponding to the switched task that is currently being executed. As a result, when rebooting the system, the CPU can be restarted while the task in which the runaway has occurred is avoided.

FIG. 2 illustrates the clear pattern as an example. In FIG. 2, a left column shows the clear patterns, and corresponding tasks (processes and threads) are shown on the right side. A clear pattern 0 corresponds to an initial value A0 corresponding to the clear pattern from the power section, and the reset of the CPU 1 is determined to be induced by the boot-up of the system. Clear patterns 1 to 10 show values corresponding to the tasks (programs A1 to A10) executed by the CPU 1. When the reset of the CPU 1 is determined to be caused by the clear patterns 1 to 10, it is possible to determine that the reset is due to the runaway of the corresponding task (the program A1 to A10).

An example of the boot-up process operation of the CPU runaway determination circuit will now be described by reference to the flowchart shown in FIG. 3.

When the power of the system is first activated, the CPU 1 performs a process for initializing the system, to thus bring the programs into a state where the programs can be launched (step S1). At this time, the CPU 1 reads whether or not the clear pattern in the register 7 in the watchdog timer 2 is the initial value (e.g., a clear pattern A0 in FIG. 2) (step S2). When the clear pattern is the initial value, it is determined that the reset caused by the boot-up of the system, and a clear pattern corresponding to the task to be started is written into the register 7. Then, a start signal is output to the start terminal of the counter 5, and the count is cleared. Thus, new counting is started, and normal operation for starting the task is performed (step S3).

When the clear pattern held in the register 7 is a value other than the initial value (e.g., any of the clear patterns A1 to A10 in FIG. 2), the CPU 1 reads the clear pattern held in the register 7 in the watchdog timer 2, therefore the task in which the runaway has occurred can be specified. The CPU 1 performs a process for restarting another task so as not to start the task in which the runaway has occurred (step S4).

Moreover, the task in which the runaway has occurred is reported to the system. For instance, the status is reported to an unillustrated server byway of a network (step S5). Thus, the efficiency of maintenance appropriate to a system failure can be enhanced.

The CPU runaway determination circuit mentioned above may also be a control circuit where a multi-CPU performs tasks, or a control circuit in which a known OS is mounted and a CPU executes a plurality of applications corresponding to tasks.

According to the above-described CPU runaway determination circuit, the watchdog timer holds the clear pattern corresponding to the task being executed by the CPU, and therefore the CPU reads the clear pattern held in the watchdog timer upon booting-up the system, thereby determining whether or not the boot-up is a reset performed by the system or a reset due to the runaway of a program being executed. Thus, the process for booting up the system can be performed by not starting the task in which the runaway has occurred. As a result, in which of the tasks for executing a plurality of programs the runaway has occurred can be specified, and the system can be reset by avoiding the restart of the task in which the run away has occurred, by a simple circuit configuration.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

FIG. 1
7 CLEAR PATTERN
1 START
2 RESET SIGNAL FROM POWER SECTION
FIG. 2
1 CLEAR PATTERN
2 TASK
3 INITIAL VALUE A0
4 PROGRAM A1
5 PROGRAM A2
6 PROGRAM A3
7 PROGRAM A4
8 PROGRAM A5
9 PROGRAM A6
10 PROGRAM A7
11 PROGRAM A8
12 PROGRAM A9
13 PROGRAM A10
FIG. 3
1 BOOT-UP PROCESS
S1 INITIALIZATION PROCESS
S2 CLEAR PATTERN IS INITIAL VALUE?
S3 NORMAL START OPERATION OF TASK
S4 DO NOT START TASK IN WHICH RUNAWAY HAS OCCURRED
S5 REPORT IN WHICH RUNAWAY HAS OCCURRED TO SYSTEM
2 COMPLETE BOOT-UP PROCESS

What is claimed is:

1. A CPU runaway determination circuit in a system, comprising:
   a CPU for executing a task; and
   a watchdog timer which has a counter that starts counting upon reception of a start signal from the CPU, and outputs a reset signal when the counter reaches a preset count value,
   wherein the watchdog timer has a register in which a clear pattern corresponding to the task is set by the CPU,
   the clear pattern in the register is rewritten into an initial value by a reset signal from a power section,
   the CPU reads the clear pattern held in the register when the system is booted up so as to determine whether the boot-up is caused by a reset by the reset signal from the power section or a reset by the reset signal from the watchdog timer, and
   when it is determined that the boot-up is caused by the reset by the reset signal from the watchdog timer, the CPU boots up the system so as not to restart the task corresponding to the clear pattern held in the register.

2. The CPU runaway determination circuit according to claim 1,
   wherein when the read clear pattern is the initial value, the CPU determines that the boot-up is caused by the reset by the reset signal from the power section, and
   when the read clear pattern corresponds to the task, the CPU determines that the boot-up is caused by the reset by the reset signal from the watchdog timer.

3. The CPU runaway determination circuit according to claim 1, further comprising:
   an OR circuit of which output terminal is connected to a reset terminal of the CPU, and of which one of input terminals is connected to an output terminal of the watchdog timer,
   wherein the OR circuit outputs a reset signal to the CPU by implementing a logical OR operation of the reset signal from the watchdog timer and the reset signal from the power section.

4. The CPU runaway determination circuit according to claim 1,
   wherein the watchdog timer has a comparator which compares a clear pattern of a clear signal output from the CPU with the clear pattern held in the register in the watchdog timer, and
   the watchdog timer clears a count value of the counter when there is a match between the clear pattern of the clear signal and the clear pattern held in the register.

5. The CPU runaway determination circuit according to claim 4, wherein the CPU outputs the clear signal to the watchdog timer at a predetermined timing while a runaway does not occur in the task being executed by the CPU.

6. The CPU runaway determination circuit according to claim 1,
   wherein when the CPU executes another task, the CPU rewrites the clear pattern held in the register into a predetermined clear pattern corresponding to the another task.

7. A CPU runaway determination method for a system, comprising:
   setting a clear pattern corresponding to a task, in a register in a watchdog timer by a CPU that executes the task;
   starting counting of a counter in the watchdog timer upon reception of a start signal from the CPU;
   outputting a reset signal from the watchdog timer when the counter reaches a preset count value;
   rewriting the clear pattern in the register into an initial value by a reset signal from a power section;
   reading the clear pattern held in the register by the CPU when the system is booted up, so as to determine whether the boot-up is caused by a reset by the reset signal from the power section or a reset by the reset signal from the watchdog timer; and
   booting up the system by the CPU so as not to restart the task corresponding to the clear pattern held in the register when it is determined that the boot-up is caused by the reset by the reset signal from the watchdog timer.

8. The CPU runaway determination method according to claim 7, further comprising:
  when the read clear pattern is the initial value, determining that the boot-up is caused by the reset by the reset signal from the power section; and
  when the read clear pattern corresponds to the task, determining that the boot-up is caused by the reset by the reset signal from the watchdog timer.

9. The CPU runaway determination method according to claim 7, further comprising:
  outputting a reset signal to the CPU from an OR circuit of which output terminal is connected to a reset terminal of the CPU, and of which one of input terminals is connected to an output terminal of the watchdog timer, by implementing a logical OR operation of the reset signal from the watchdog timer and the reset signal from the power section.

10. The CPU runaway determination method according to claim 7, further comprising:
  comparing a clear pattern of a clear signal output from the CPU with the clear pattern held in the register in the watchdog timer, by a comparator in the watchdog timer; and
  clearing a count value of the counter when there is a match between the clear pattern of the clear signal and the clear pattern held in the register.

11. The CPU runaway determination method according to claim 10, further comprising:
  outputting the clear signal to the watchdog timer from the CPU at a predetermined timing while a runaway does not occur in the task being executed by the CPU.

12. The CPU runaway determination method according to claim 7, further comprising:
  when the CPU executes another task, rewriting the clear pattern held in the register into a predetermined clear pattern corresponding to the another task.

* * * * *